United States Patent [19]
Lee

[11] Patent Number: 5,963,015
[45] Date of Patent: Oct. 5, 1999

[54] EXTERNAL BATTERY CHARGER FOR USE WITH A BATTERY POWERED ELECTRONIC DEVICE AND AN EXTRA BATTERY

[75] Inventor: Kyeong-Su Lee, Suwon, Rep. of Korea

[73] Assignee: SamSung Electronics Co., Ltd., Suwon, Rep. of Korea

[21] Appl. No.: 09/082,382

[22] Filed: May 21, 1998

[30] Foreign Application Priority Data

May 21, 1997 [KR] Rep. of Korea ...................... 97-19642

[51] Int. Cl.⁶ .......................... H01M 10/44; H01M 10/46
[52] U.S. Cl. ............................................................ 320/128
[58] Field of Search ................................... 320/125, 126, 320/128, 137, 138, DIG. 11

[56] References Cited

U.S. PATENT DOCUMENTS

| | | |
|---|---|---|
| 5,073,837 | 12/1991 | Baek . |
| 5,189,358 | 2/1993 | Tomura et al. . |
| 5,200,685 | 4/1993 | Sakamoto . |
| 5,272,382 | 12/1993 | Heald et al. . |
| 5,317,249 | 5/1994 | Ford . |
| 5,347,163 | 9/1994 | Yoshimura . |
| 5,465,039 | 11/1995 | Narita et al. . |
| 5,481,730 | 1/1996 | Brown et al. . |
| 5,483,464 | 1/1996 | Song . |
| 5,534,762 | 7/1996 | Kim . |
| 5,553,294 | 9/1996 | Nanno et al. . |
| 5,557,738 | 9/1996 | Townsley et al. . |
| 5,563,493 | 10/1996 | Matsuda et al. . |
| 5,572,110 | 11/1996 | Dunstan . |
| 5,583,417 | 12/1996 | Yuen . |
| 5,585,677 | 12/1996 | Cheon et al. . |
| 5,610,450 | 3/1997 | Saeki et al. . |
| 5,661,780 | 8/1997 | Yamamoto et al. . |
| 5,664,203 | 9/1997 | Hong et al. . |
| 5,721,481 | 2/1998 | Narita et al. . |

*Primary Examiner*—Edward H. Tso
*Attorney, Agent, or Firm*—Robert E. Bushnell, Esq.

[57] ABSTRACT

An external battery charger for supplying power from an AC adapter both to a portable electronic device and a battery includes: a DC input port connected to a DC output of the AC adapter and an extra DC output port connected to a DC input port of the portable electronic device, in which the DC output port is connected to a DC input port of the external battery charger. A load current detector is disposed in a power supply line connected to the extra DC output port for determining an amount of current drawn by the portable electronic device. Preferably, this charger includes a microcontroller, in response to an amount of the load current detected by the load current detector, producing a first control signal representing a load current approximately equal to a maximum current rate designated by the portable device, and producing a second control signal representing an amount of charging current being supplied to the battery through a charge regulator. The second control signal is supplied to the charge regulator for charging the battery with the remainder of the power used by the portable electronic device. Further, a switch is provided between the DC input port and the charge regulator for interrupting power supply line connected to the charge regulator, in response to the first control signal from the microcontroller. This provides for a maximization of the usage of a battery charger since power for the extra battery and the portable computer can be achieved simultaneously using only one AC adapter.

11 Claims, 6 Drawing Sheets

EXTERNAL BATTERY CHARGER FOR USE WITH A BATTERY POWERED ELECTRONIC DEVICE AND AN EXTRA BATTERY

CLAIM OF PRIORITY

This application makes reference to, incorporates the same herein, and claims all benefits accruing under 35 U.S.C. §119 from an application for AN EXTERNAL BATTERY CHARGER FOR USING WITH A BATTERY POWERED ELECTRONIC DEVICE AND A METHOD FOR CHARGING THE EXTRA BATTERY USING THE SAME earlier filed in the Korean Industrial Property Office on the May $21^{st}$, 1997 and there duly assigned Ser. No. 19642/1997.

BACKGROUND OF THE INVENTION

1. Field of the Invention

The present invention relates to an external battery charger, and more particularly to an external battery charger which is selectively operable for use with an extra charging battery and a battery powered electronic device, and to a method of charging the extra battery using the charge.

2. Description of the Related Art

Recently, rechargeable batteries, i.e., secondary batteries, have been widely used in battery powered electronic devices, for example, portable radio cassette players, portable computers, camcorders, cellular telephones, etc. Hitherto, alkaline batteries such as nickel cadmium (Ni—Cd) or nickel metal hydride (Ni-MH) batteries have been generally used as the secondary battery. Today, lithium ion (Li-ion) batteries of an organic electrolytic cell have gained big popularity in high-end portable electronic devices, since they exhibit high energy density, low temperature characteristics, and stable storage capability.

The abovenoted rechargeable batteries require a charger for charging the batteries. The charger includes an internal charger equipped in the battery powered device; this charger will begin charging the battery whenever the device is powered by AC power. Further, an external battery charger has been implemented; this charger has an independent power supply and connectors for accepting one or more batteries to be charged.

The external battery charger is useful for the users of battery powered devices to prepare extra charged batteries. Extra charged batteries or batteries are carried to operate the portable electronic devices for lengthy periods of time in environments where AC power is unavailable. When the external battery charger is optionally adopted in a portable computer, for example, usually an AC adapter is used to supply power to the external battery charger or alternatively to the internal battery charger of the portable computer. Thus, while the AC adapter is used with the external battery charger, the portable computer must be operated by battery power. If it is necessary for the portable computer be operated with AC power, the user must use another AC adapter which results in additional expense.

Further, if the portable computer is operated with the DC power supplied by the AC adapter, it has been found that the load current at the output of the AC adapter is considerably reduced when the portable computer has entered a power saving mode of operation.

Therefore, a need arises in the external battery charger to share the DC power supplied by an AC adapter with a portable computer and to charge extra batteries with the remainder of the power used by the portable computer.

The following each disclose features in common with the present invention but do not teach or suggest the specifically recited external battery charger of the present invention: U.S. Pat. No. 5,189,358 to Tomura et al., entitled Adaptor For Mounting Portable Radio Apparatus To Moving Body And Charger For Portable Radio Apparatus, U.S. Pat. No. 5,073,837 to Baek, entitled Low Voltage Protection Circuit, U.S. Pat. No. 5,200,685 to Sakamoto, entitled Adapter For External Battery And Batterer System, U.S. Pat. No. 5,272,382 to Heald et al., entitled Power Supply For Computer System Manager, U.S. Pat. No. 5,317,249 to Ford, entitled Transmit Mode Detector In A Battery Charger, U.S. Pat. No. 5,347,163 to Yoshimura, entitled Power Supply Backup Device For Use In Portable Electronic Apparatus, U.S. Pat. No. 5,465,039 to Narita et al., entitled Power Supply For Electronic Device, And Electronic Device System, U.S. Pat. No. 5,664,203 to Hong et al., entitled Peripheral Device Input-Initiated Resume System For Combined Hibernation System And Back-Up Power Stipplv For Computer, U.S. Pat. No. 5,661,780 to Yarnamoto et al., entitled Cordless Telephone Having Power Failure Detection Circuit, U.S. Pat. No. 5,721,481 to Narita et al., entitled Battery Charger For An Electronic Device And A Spare Battery, U.S. Pat. No. 5,610,450 to Saeki et al., entitled Power Supply Apparatus For Efficiently Utilizing Battery And Electronic Apparatus Using The Power Supply, U.S. Pat. No. 5,583,417 to Yuen, entitled Power Sharing Detector For Use With A Battery Charger And An Auxiliary Device, U.S. Pat. No. 5,572,110 to Dunstan, entitled Smart Battery Charger System, U.S. Pat. No. 5,557,738 to Townsley et al., entitled Power System Configuration And Recovery From A Power Fault Condition In A Computer System Having Multiple Power Supplies, U.S. Pat. No. 5,563,493 to Matsuda et al., entitled Power Source System Of Portable Information Processing System Using Battery, U.S. Pat. No. 5,553,294 to Nanno et al., entitled Portable Computer Powered By Rechargeable Batteries, U.S. Pat. No. 5,481,730 to Brown et al., entitled Monitoring And Control Of Power Supply Functions Using A Microcontroller, U.S. Pat. No. 5,483,464 to Song, entitled Power Saving Apparatus For Use In Peripheral Equipment of A Computer, U.S. Pat. No. 5,534,762 to Kim, entitled Self-Propelled Cleaning Robot Operable In A Cordless Mode And A Cord Mode, and U.S. Pat. No. 5,585,677 to Cheon et al., entitled Backup Power-Supply System For Emergence.

SUMMARY OF THE INVENTION

It is therefore an object of the invention to provide an external battery charger which can supply power from an AC adapter to a portable electronic device and to extra batteries.

It is another object of the present invention to provide a method of charging an extra battery using the above mentioned external battery charger.

It is still another object of the present invention to provide a battery charger for use in portable computers which charges a battery with the remainder of the power used by the portable computer.

In accordance with one aspect of the present invention, there is provided an external battery charger which comprises: a DC input port connected to a DC output of an AC adapter; a charge regulator for supplying a charging current to a battery; an extra DC output port connected to a DC input port of a portable electronic device, the DC output port being connected to the DC input port of the external battery charger; a load current detector disposed within a power supply line connected to the extra DC output port for determining an amount of current drawn by the portable electronic device; a microcontroller, in response to the amount of load current detected by the load current detector, producing a first control signal representing a load current approximately equal to a maximum current rate designated by the portable device and producing a second control signal representing an amount of the charging current being supplied to the battery, the second control signal being supplied to the charge regulator for charging the battery with a remainder of the power used by the portable electronic device; and a switch disposed between the DC input port and the charge regulator for interrupting a power supply line connected to the charge regulator, the switch being responsive to the first control signal from the microcontroller.

In accordance with the present invention, a method provided is for charging an extra battery which comprises the steps of: detecting a load current consumed by a portable electronic device; determining whether the detected load current is approximately equal to a maximum current rate set in a DC input line of the portable electronic device; determining the ratio of the detected load current and the maximum current rate; and determining a charging current rate supplied to the extra battery such that the amount of charging current is equal to a remainder of the power used by the portable electronic device.

Preferably, the method further comprises the step of interrupting a power supply line connected to the external battery charger, if the load current is approximately equal to the maximum current rate.

According to this invention, the charging current rate is set to the maximum charging current rate if the value of the load current falls to zero (0). Further, the charging current rate is set to approximately 90% of the maximum charging current rate, if the value of the load current (IL) falls to 10% of the maximum current rate.

In accordance with another aspect of the present invention, there is provided a battery charger for supplying power from an AC adapter both to system components of a portable electronic device and a rechargeable battery, the battery charger comprising: a charge regulator for controlling an amount of charging current being supplied to the battery; a load current detector disposed in a power supply line connected to the system components of the portable electronic device for determining an amount of current drawn by the portable electronic device; a microcontroller, in response to the amount of the load current detected by the load current detector, producing a first control signal representing the load current approximately equal to a maximum current rate designated by the portable electronic device and a second control signal representing an amount of charging current being supplied to the battery, the second control signal being supplied to the charge regulator for charging the battery with the remainder of the power used by the portable electronic device; and a switch disposed between the DC input port and the charge regulator for interrupting power supply line connected to the charge regulator, the switch being responsive to the first control signal from the microcontroller.

According to this invention, the usage of an external battery charger is maximized since power for the extra battery and for a portable electronic device can be achieved effectively by using only one AC adapter. Also, this invention provides a simple and effective battery charging method which is applicable to both an external battery charger and internal battery charger for use in a portable computer as the battery charging is effected with the remainder of the power used by the portable computer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
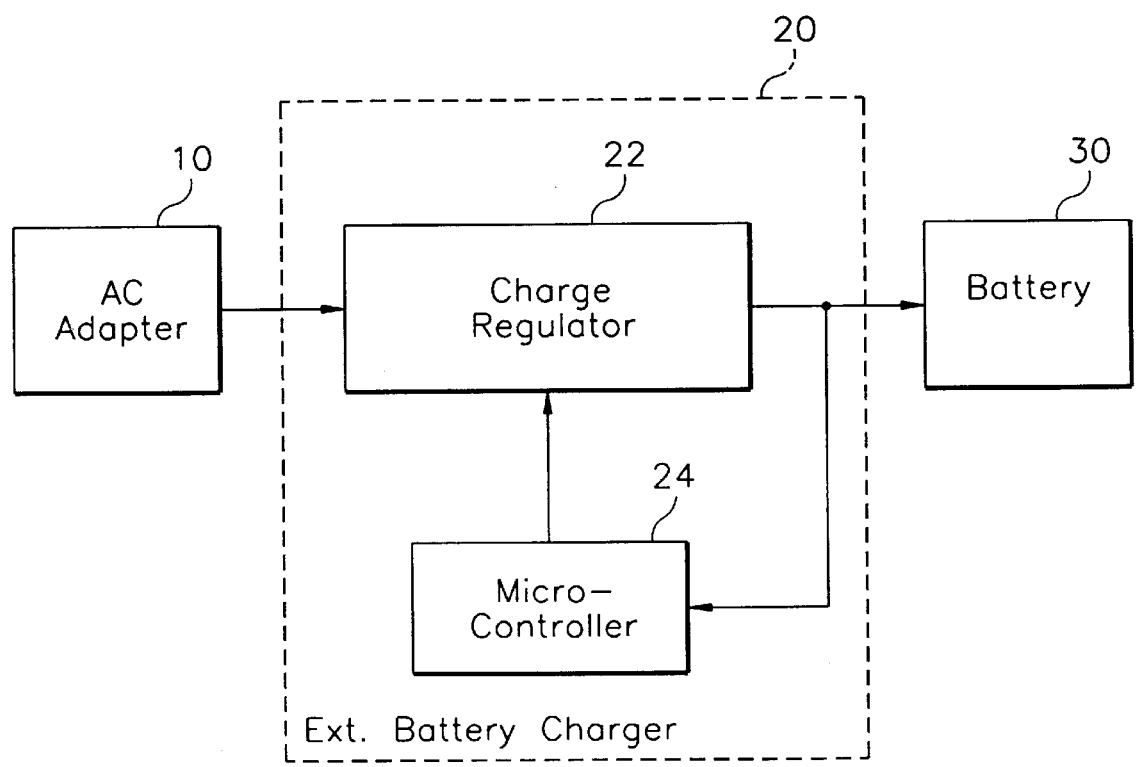
FIG. 1 is a block diagram depiction of an earlier external battery charger which regulates DC power supplied by an AC adapter to charge extra batteries connected to the charger.

Referring to FIG. 1, there is shown an earlier external battery charger 20 which charges a rechargeable battery 30 used in a portable electronic device with DC power supplied by an AC adapter 10 connected to an AC outlet. The external battery charger 20 includes a charge regulator 22 and a microcontroller 24 to perform a constant voltage charging mode of operation, for example. The constant voltage charging mode supplies a constant voltage higher than the nominal voltage of the battery 30. This method is used in charging a battery where frequent charging/discharging is not occurring.

When the external battery charger 20 is used in a battery powered portable computer, the external battery charger 20 necessitates an independent power supply such as the AC adapter 10. Alternatively, this AC adapter 10 is designed to be used with the portable computer for supplying power to the portable computer and the internal battery charger. Therefore, when the portable computer uses the AC adapter 10, the external battery charger 20 cannot be used to charge the extra battery 30.

Figure 2:
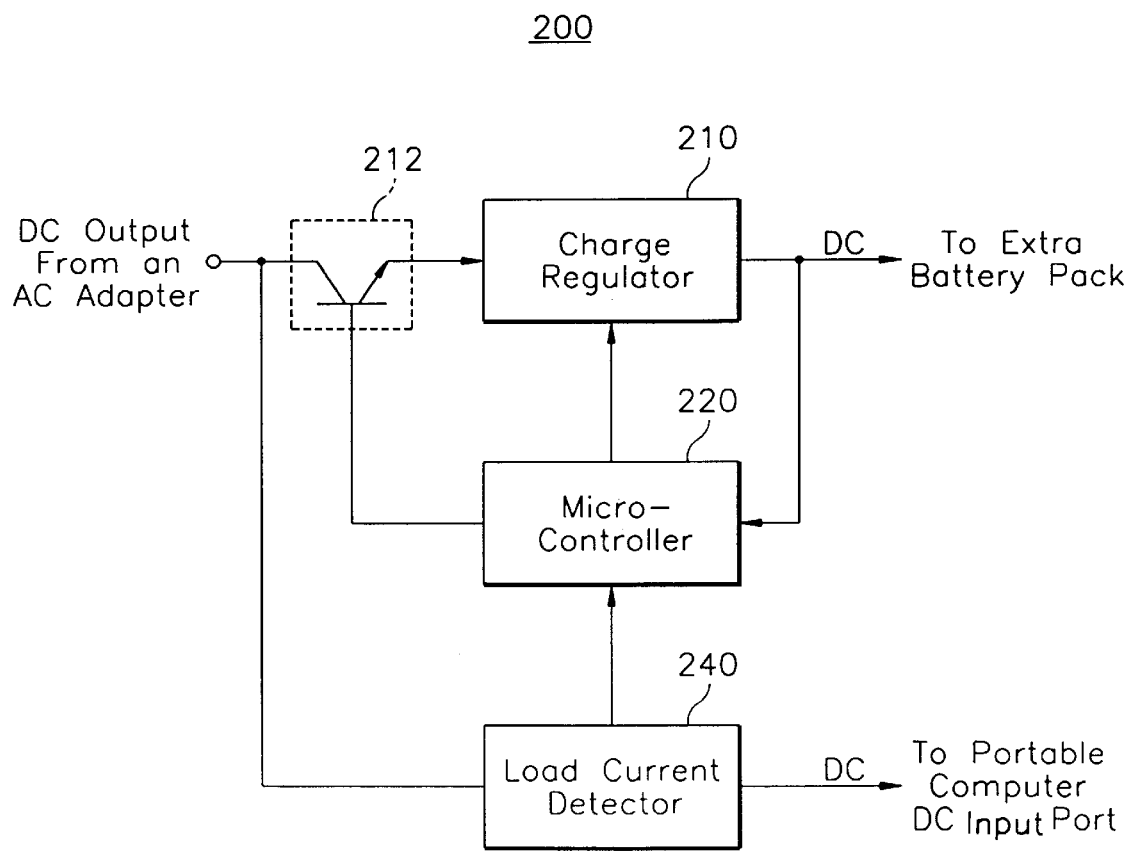
FIG. 2 is a block diagram of an external battery charger in accordance with the present invention.

The present invention relates to an external battery charger which can supply power from an AC adapter both to the portable computer and the extra battery. Referring to FIG. 2, there is shown an external battery charger in accordance with the present invention. The external battery charger 200 includes a charge regulator 210, a microcontroller 220, a load current detector 240, and a switching circuit 212.

A DC input port of the external battery charger 200 is connected to the charge regulator 210 through the switching circuit 212 and to a DC input port of a portable computer through the load current detector 240. The load current detector 240 outputs a load current signal corresponding to the amount of current drawn by the portable computer. The microcontroller 220 controls the turn on/off of the switching circuit 212 and controls the charging current rate of the charge regulator 210 in response to the load current signal from the load current detector 240. The output of the charge regulator 210 is connected to the extra battery to be charged.

Figure 3:
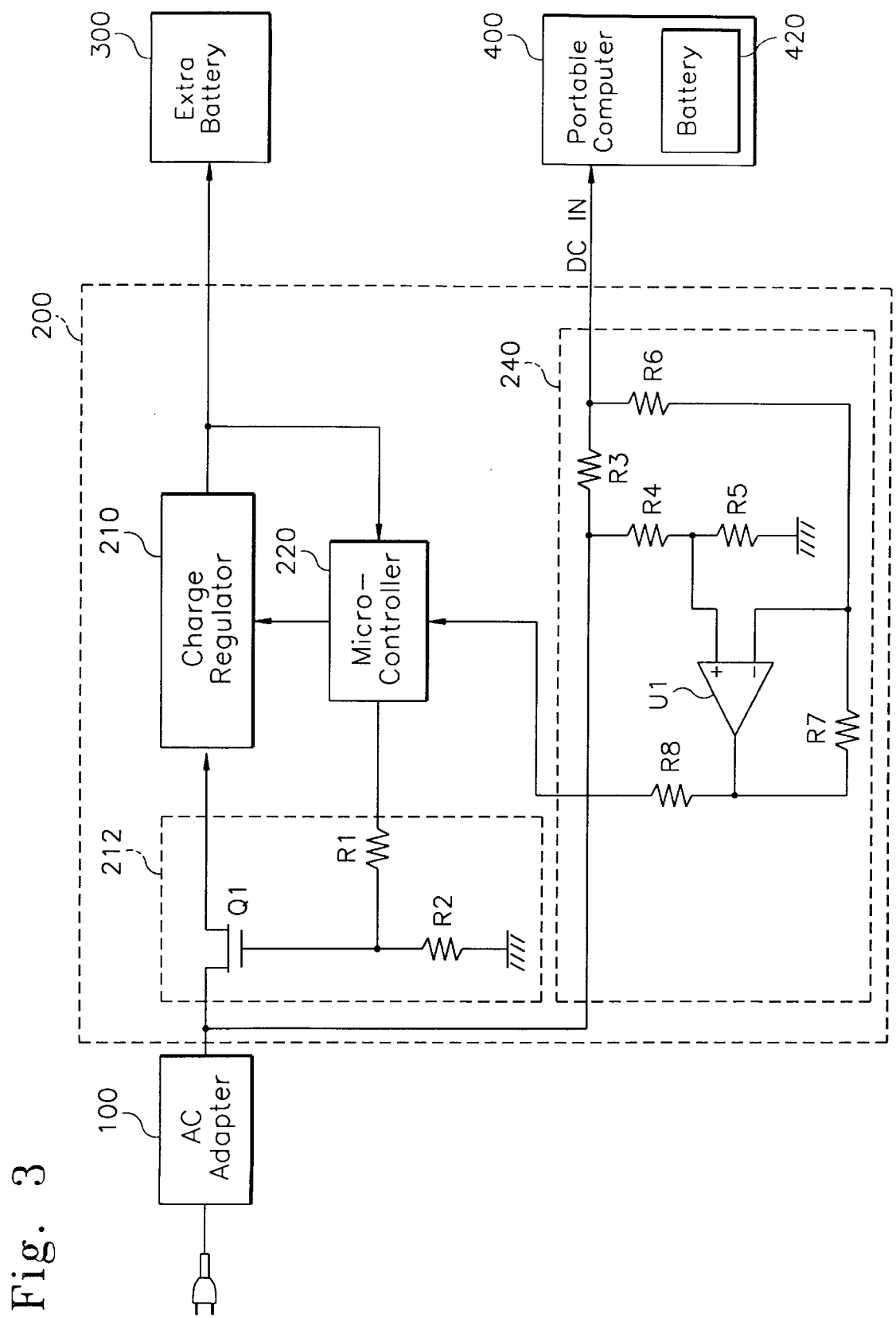
FIG. 3 is a detailed diagram of the external battery charger of FIG. 2 incorporating an AC adapter at a DC input thereof and having its DC output connected to extra batteries and to a portable computer.

A detailed circuit configuration of the external battery charger 200 is shown in FIG. 3. A DC output of an AC adapter 100 is coupled to an input of the switching circuit 212 and to the input of the load current detector 240. The switching circuit 212 consists of an MOS transistor Q1 and bias resistors R1 and R2. Connected to the drain of the MOS transistor Q1 is the output of the AC adapter 100 and the source of the transistor Q1 is connected to an input of the charge regulator 210. A gate of the transistor Q1 is coupled to one output of the microcontroller 220 via the bias resistors R1 and R2.

The load current detector 240 includes a current sensing resistor R3, voltage divider resistors R4 and R5, an operational amplifier U1, and resistors R6, R7, and R8. The divider resistors R4 and R5 are coupled between end of the current sensing resistor R3 and ground. The junction point of the voltage divider R4 and R5 is connected to a non-inverting input of the operational amplifier U1. Another end of the current sensing resistor R3 is coupled to an inverting input of the operational amplifier U1 via resistor R6. Also, the inverting input of the operational amplifier U1 is connected to the output of the operational amplifier U1 via resistor R7 and the output of the operational amplifier U1 is coupled to one input of the microcontroller 220 via resistor R8. The DC output of the charge regulator 210 is also coupled to another input of the microcontroller 220 and to the terminal of an extra battery 300. The another end of the current sensing resistor R3, that is the output of the load current detector 240 is connected to a DC input port of a portable computer 400. As usual, the portable computer 400 has an internal battery charger (not shown) for charging the battery 420 when it is incorporated within the portable computer 400. Further, the portable computer 400 may be operated alternatively by the DC power supplied by the AC adapter 100 when the battery 420 is not installed.

With this arrangement, the current flowing through the resistor R3 of the load current detector 240 is converted into a voltage difference across both terminals of the resistor R3 and this difference is detected by the operational amplifier U1. The varying of the load current through the resistor R3 results in variation of the output voltage of the operational amplifier U1. Thus, the voltage variation outputted from the load current detector 240 is supplied to the microcontroller 220. If both the extra battery 300 and the portable computer 400 are coupled to the external battery charger, the microcontroller 220 first detects an output value of the load current detector 240. If the portable computer is shut off and no current is drawn through the resistor R3, the zero voltage output is detected by the microcontroller 220 and a high voltage signal is supplied to the input of the switching circuit 212. Then, the transistor switch Q1 is turned on.

When the transistor switch Q1 is turned on, the microcontroller 220 also detects the output current of the charge regulator 210 to determine whether or not the extra battery 300 is connected. If the extra battery 300 is connected, and no current is drawn by the computer system, the microcontroller 220 controls the charging operation of the charge regulator 210 such that the current supplied to the extra battery 300 is set to the maximum charging current rate (Icmax).

Conversely, if the portable computer is turned on, and the maximum current output provided by the AC adapter 100 is drawn through the resistor R3, the corresponding voltage output is detected by the microcontroller 220 and a low voltage signal is supplied to the input of the switching circuit 212. Then, the transistor switch Q1 is turned off and the current supplied to the extra battery 300 is cut off. Therefore, the output power of the AC adapter 100 is fully supplied to the portable computer 400.

Further, if the portable computer is turned on and operating below the maximum current rate, the microcontroller 220 detects the voltage difference across both terminals of the resistor R3 and produces the corresponding voltage signal supplied to the charge regulator 210 in order to control the amount of the charging current supplied to the extra battery 300. This enables the external battery charger 200 to share the DC power supplied by the AC adapter 100 with the portable computer 400. Also, charging the extra battery 300 with the remainder of the power used by the portable computer 400 is possible.

Figure 4:
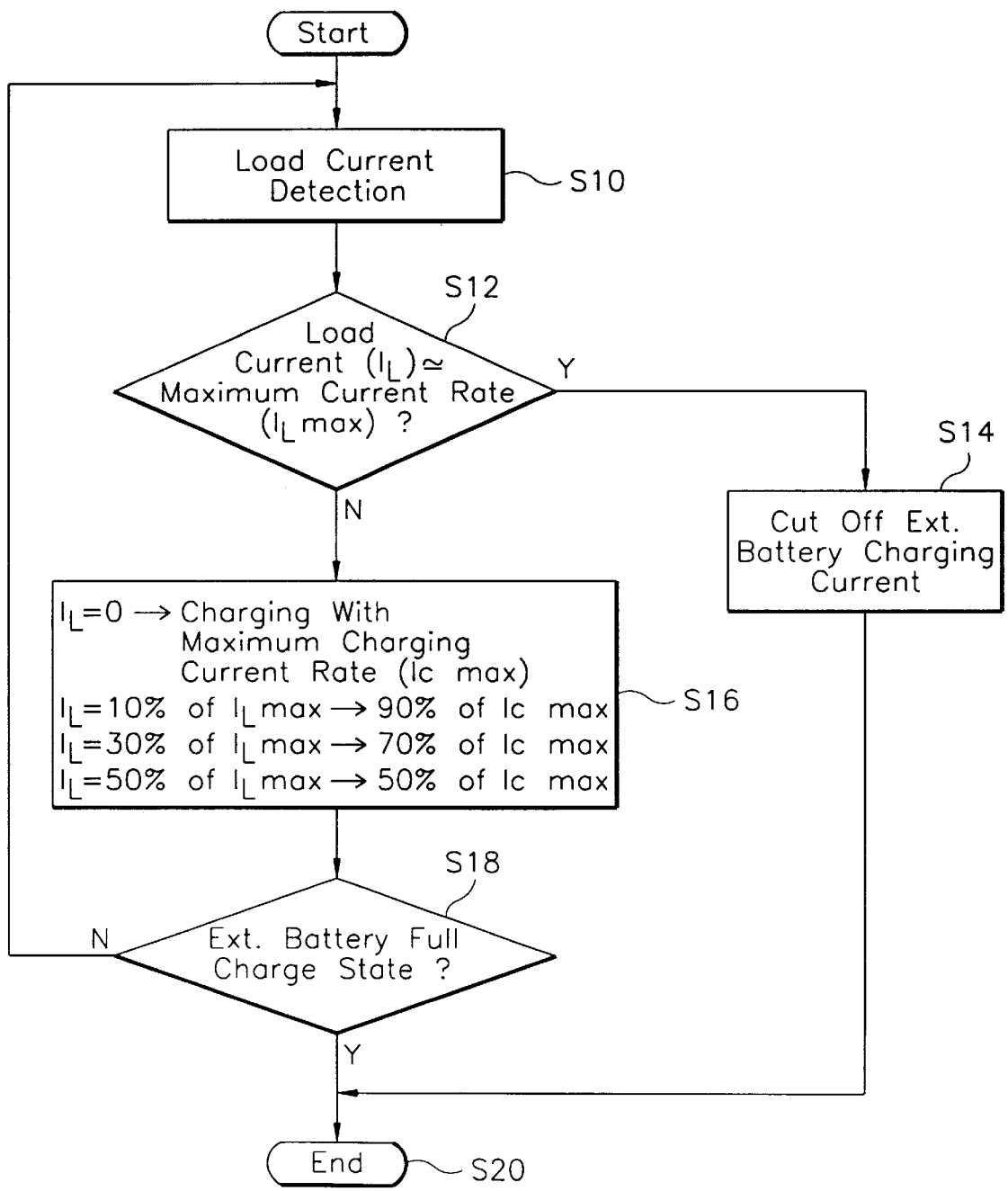
FIG. 4 is a flowchart showing a method of charging an extra battery using the external battery charger of FIG. 2 in accordance with the present invention.

The detailed charging operation of the external battery charger 200 can be seen from the flowchart of FIG. 4. The following process assumes that both the extra battery 300 and portable computer 400 are connected to the extra battery charger 200. At step 10, the microcontroller 220 detects the load current through the resistor R3 of the load current detector 240. The load current (IL) can be converted into a voltage level produced by the operational amplifier U1. This voltage level is compared with preset voltage ranges stored in a ROM table of the microcontroller 220. In this regard, a determination is made at step 12 as to whether the load current is approximately the same as the maximum current rate (ILtnax) set in the DC input line of the portable computer 400.

If the load current (IL) is approximately the same as the maximum current rate (ILmax), the microcontroller 220 disables the switching circuit 212 at step 14, in order to cut off a power supply line connected to the extra battery 300. On the other hand, if the load current (IL) is below the maximum current rate (ILmax), the microcontroller 220 detects a voltage level corresponding to the current measured by the load current detector 240 and checks the detected voltage level up to preset voltage ranges. If the detected voltage level falls under a preset voltage range, a control signal corresponding to the preset voltage range is produced at one output of the microcontroller 220. The control signal outputted from the microcontroller 220 is supplied to the charge regulator 210 in order to control a charging current rate for the extra battery 300 such that the amount of charging current is designated by the remainder of the power used by the portable computer 400 (step 16).

As an example, if the value of load current (IL) falls to zero (0), the charging current rate is set to the maximum charging current rate (Icmax). For the load current (IL) that is 10% of the maximum current rate (ILmax), when the portable computer 400 has entered into its suspend mode, the charging current rate is set to approximately 90% of the maximum charging current rate (Icmax). Further, for the load current (IL) that is 30% of the maximum current rate (ILmax), the charging current rate is set to approximately 70% of the maximum charging current rate (Icmax). In addition, for the load current (IL) that is 50% of the maximum current rate (ILmax), the charging current rate is set to approximately 50% of the maximum charging current rate (Icmax).

Next, at step 18, the microcontroller 220 checks the charging state of the extra battery 300 during the abovenoted charging operation, and if the battery 300 is in full charge state, the microcontroller 220 allows the charge regulator 210 to stop the charging operation for the extra battery.

Figure 5:
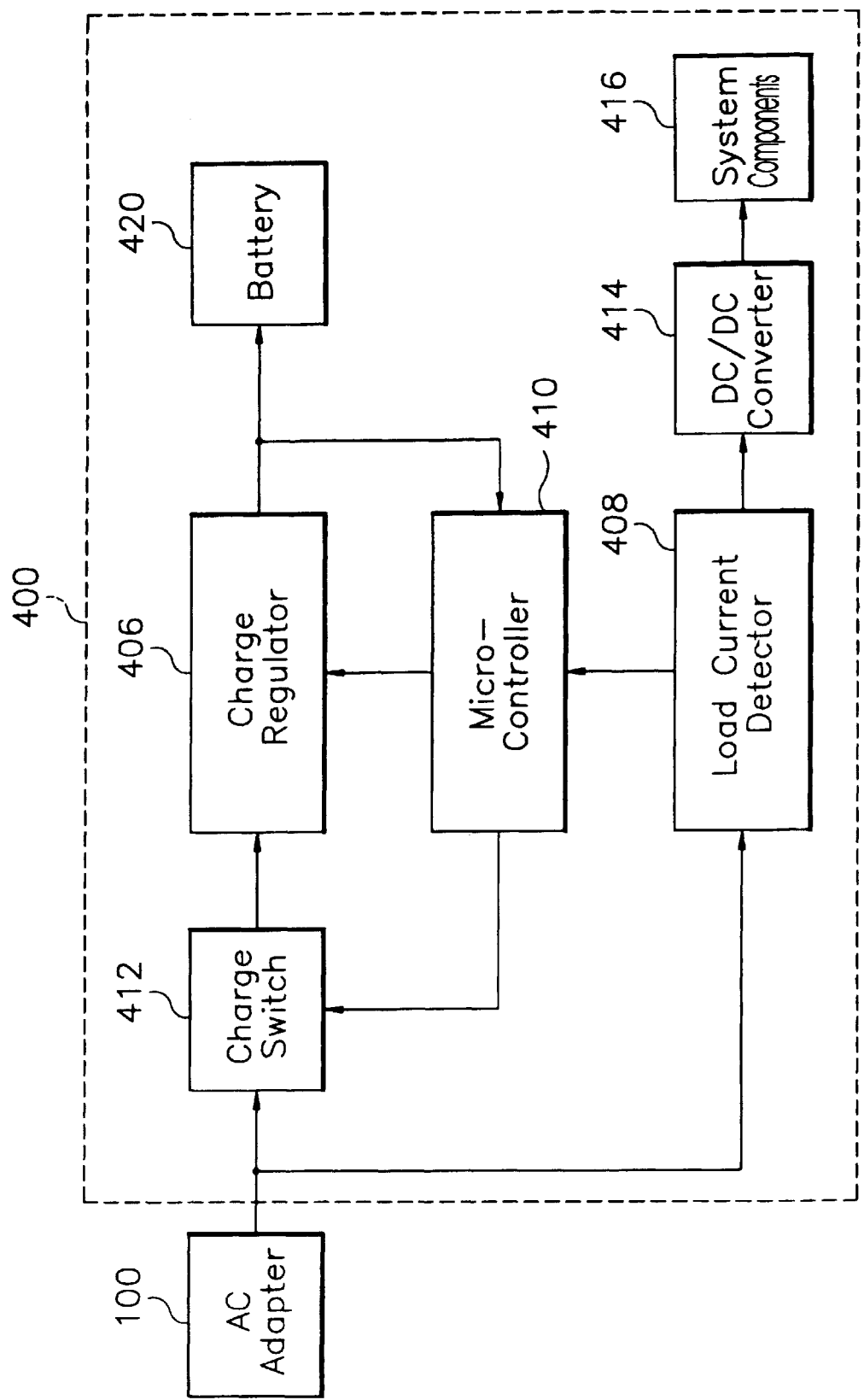
FIG. 5 is a block diagram of a battery charger for use in a portable computer which adopts the charging method in accordance with the present invention.

Referring to FIG. 5, there is shown a battery charger for use in portable computer which adopts the abovenoted charging method in accordance with the present invention. In a fashion similar to the external battery charger shown in FIG. 2, the battery charger 400 includes a charge regulator 406, a nicrocontroller 410, a charge switch 412, a load current detector 408, and a DC/DC converter 414.

A DC output of an AC adapter 100 is connected to the charge regulator 406 through the charge switch 412 and to the DC/DC converter 414 through the load current detector 408. The load current detector 408 outputs a load current signal corresponding to the amount of current drawn by system components 416 of the portable computer. The microcontroller 410 controls the turn on/off of the charge switch 412 and controls the charging current rate of the charge regulator 406 in response to the load current signal from the load current detector 408. The output of the charge regulator 406 is coupled to the battery 420 to be charged.

Figure 6:
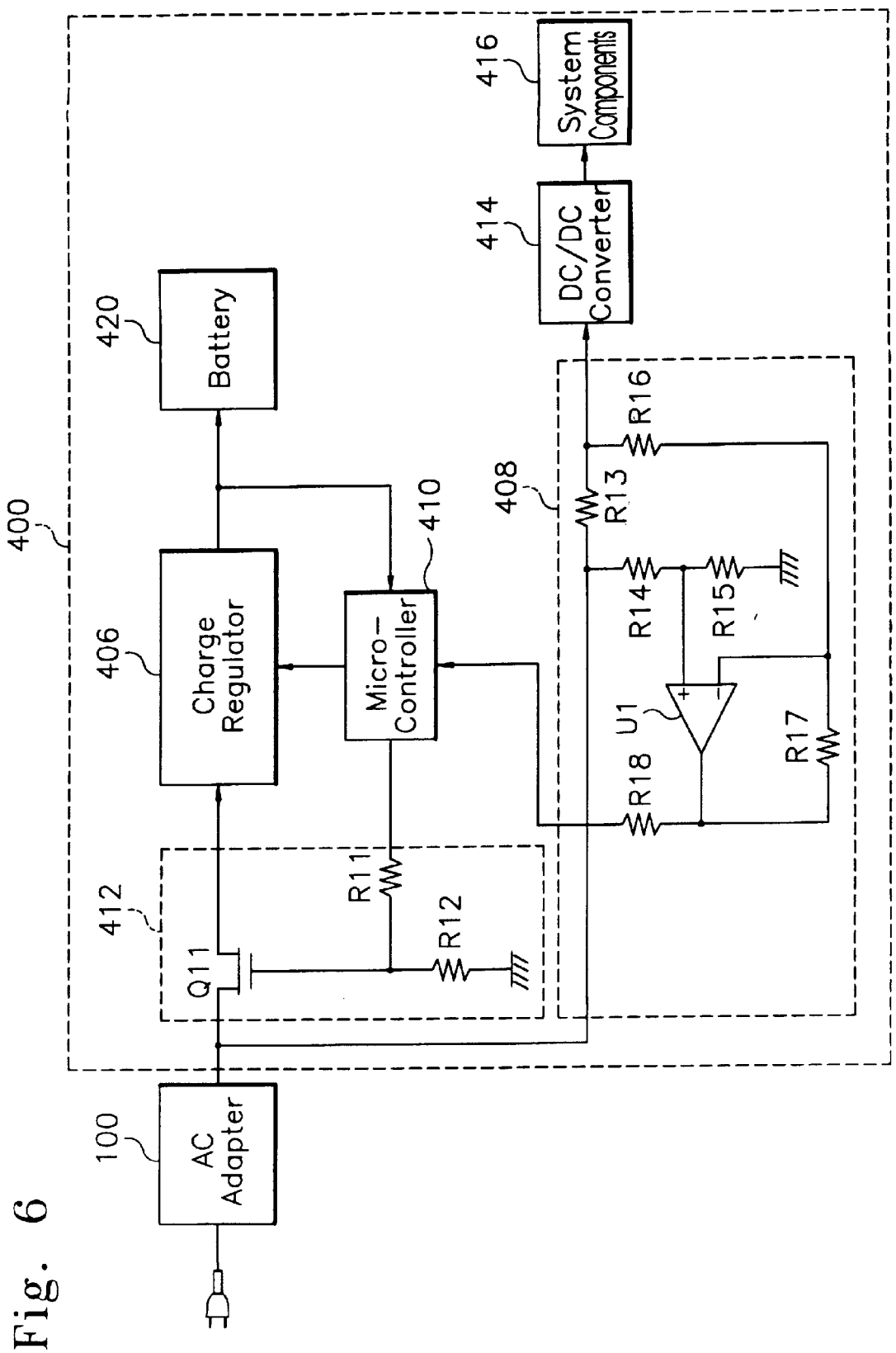
FIG. 6 is a schematic diagram of the battery charger shown in FIG. 5.

A detailed circuit configuration of the battery charger 400 is shown in FIG. 6. A DC output of the AC adapter 100 is coupled to an input of the charge switch 412 and to the input of the load is current detector 408. The charge switch 412 consists of a MOS transistor Q11 and bias resistors R11 and R12. Connected to the drain of the MOS transistor Q11 is the DC output of the AC adapter 100. The source of the transistor Q11 is connected to an input of the charge regulator 406. A gate of the transistor Q11 is coupled to a control output of the microcontroller 410 through the bias resistors R11 and R12.

The load current detector 408 includes a current sensing resistor R13, voltage divider resistors R14 and R15, an operational amplifier U1, and resistors R16, R17, and R18. The divider resistors R14 and R15 are coupled between one end of the current sensing resistor R13 and ground. The junction point of the voltage divider R14 and R15 is connected to a non-inverting input of the operational amplifier U1. Another end of the current sensing resistor R13 is coupled to an inverting input of the operational amplifier U1 via resistor R16 and to the input of the DC/DC converter 414. Also, the inverting input of the operational amplifier U1 is connected back to the output of the operational amplifier U1 via resistor R17 and the output of the operational amplifier U1 coupled to one input of the microcontroller 410 via resistor R18.

The DC output of the charge regulator 406 is also coupled to another input of the microcontroller 410 for sensing a state-of-charge of the battery 420. The DC/DC converter 414 converts the DC output voltage of the adapter 100 into a DC voltage required by the system components 416 of portable computer 400.

With this arrangement, the current flowing through the resistor R13 of the load current detector 408 is converted into a voltage difference across both terminals of the resistor R13, and this difference is detected by the operational amplifier U1. A varying of the load current through the resistor R13 results in variation of the output voltage of the operational amplifier U1. Thus, the voltage variation outputted from the load current detector 240 is supplied to the microcontroller 410. If charging of the battery 420 is performed during the operation of the system components 416, the microcontroller 410 first detects an output value of the load current detector 408. If all of the system units 416 are shut off and nearly no current passes through the resistor R13, the zero voltage output of U1 is detected by the microcontroller 410, thereby producing a high voltage signal. This high level signal is supplied to the gate of the charge switch 412 and thus the transistor Q11 is turned on.

When the transistor Q11 is turned on, the microcontroller 410 also detects an output current of the charge regulator 406 to determined whether or not the battery 420 is connected. If the battery 420 is connected, and no current is drawn by the system components 416, the microcontroller 410 controls the charging operation of the charge regulator 406 such that the charging current supplied to the battery 300 is set to the maximum charging current rate (Icmax).

Conversely, if the system components 416 are in a full-on state and almost the maximum current from the AC adapter 100 passes through the resistor R13 of the load current detector 408, the corresponding voltage variation is detected by the microcontroller 410, thereby producing a low voltage signal being supplied to the gate of the switch 412. Then, the transistor switch Q11 is turned off and the current supplied to the battery 420 is cut off. Therefore, the most of output power of the AC adapter 100 is supplied to the system components of the portable computer.

Further, if the system components are operating below the maximum current rate, the microcontroller 410 detects the voltage difference across both terminals of the resistor R13 and produces the corresponding voltage signal which is supplied to the charge regulator 406 in order to control the amount of the charging current supplied to the battery 420. This enables the battery 420 to share the DC power supplied by the AC adapter 100 with the system components 416 of the portable computer. Also, it is possible to charge the battery 420 with the remainder of the power used by the system components 416 of the portable computer.

As apparent from the foregoing description, the external battery charger according to this invention provides for a maximization of usage of a battery charger since power for the extra battery and the portable computer can be supplied simultaneously using only one AC adapter. Further, the invention provides a cost-saving and time-saving method for charging the extra battery, since charging the extra battery can be performed during the operation of the portable computer such that amount of charging current is designated by the remainder of the power used by the portable computer.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An external battery charger for supplying power from an AC adapter to both a portable electronic device and a battery, the charger comprising:

a DC input port connected to a DC output of the AC adapter;

a charge regulator for supplying a charging current to the battery;

an extra DC output port connected to a DC input port of the portable electronic device, a DC output port being connected to a DC input port of the external battery charger;

a load current detector disposed in a power supply line connected to the extra DC output port for determining an amount of current drawn by the portable electronic device;

a microcontroller, in response to an amount of load current detected by the load current detector, producing a first control signal representing a load current approximately equal to a maximum current rate designated by the portable device and producing a second control signal representing an amount of charging current being supplied to the battery, the second control signal being supplied to the charge regulator for charging the battery with the remainder of the power used by the portable electronic device; and a switch disposed between the DC input port and the charge regulator for interrupting a power supply line connected to the charge regulator, the switch being responsive to the first control signal from the microcontroller.

2. The external battery charger of claim 1, the switch comprising an MOS transistor and bias resistors.

3. The external battery charger of claim 1, the load current detector comprising a current sensing resistor, voltage divider resistors, an operational amplifier, and another resistor; the divider resistors being coupled between one end of the current sensing resistor and ground and a junction point of the voltage divider resistors being connected to a non-inverting input of the operational amplifier, and another end of the current sensing resistor being coupled to an inverting input of the operational amplifier via the another resistor.

4. A method of charging a battery through an external battery charger which supplies power from an AC adapter both to a portable electronic device and the battery, the method comprising the steps of:

detecting a load current consumed by the portable electronic device;

determining whether the detected load current is approximately equal to a maximum current rate set in a DC input line of the portable electronic device;

determining the ratio of the detected load current and the maximum current rate; and determining a charging current rate supplied to the battery such that the amount of charging current is equal to a remainder of the power used by the portable electronic device.

5. The method of claim 4, further comprising the step of:

interrupting a power supply line connected to the external battery charger, upon the load current being approximately equal to the maximum current rate.

6. The method of claim 4, further comprising the steps of:

determining a charging state of the battery during the charging operation;

causing the external battery charger to stop the charging operation for the battery upon the charging state of the battery being determined to be fully charged.

7. The method of claim 4, the charging current rate being set to the maximum charging current rate upon the value of the load current falling to zero.

8. The method of claim 4, the charging current rate being set to approximately 90% of the maximum charging current rate upon the value of the load current falling to 10% of the maximum current rate.

9. A battery charger for supplying power from an AC adapter to both system components of a portable electronic device and a rechargeable battery, the charger comprising:

a charge regulator for controlling an amount of charging current being supplied to the battery;

a load current detector disposed in a power supply line connected to the system components of the portable electronic device for determining an amount of current drawn by the portable electronic device;

a microcontroller, in response to the amount of the load current detected by the load current detector, producing a first control signal representing the load current being approximately equal to a maximum current rate designated by the portable electronic device and a second control signal representing an amount of charging current being supplied to the battery, the second control signal being supplied to the charge regulator for charging the battery with the remainder of the power used by the portable electronic device; and a switch disposed between the DC input port and the charge regulator for interrupting a power supply line connected to the charge regulator, the switch being responsive to the first control signal from the microcontroller.

10. The battery charger of claim 9, the switch comprising an MOS transistor and bias resistors.

11. The battery charger of claim 9, the load current detector comprising: a current sensing resistor, voltage divider resistors, an operational amplifier, and a feedback resistor; the divider resistors being coupled between one end of the current sensing resistor and ground and a junction point of the voltage divider resistors being connected to a non-inverting input of the operational amplifier, and another end of the current sensing resistor being coupled to an inverting input of the operational amplifier via the feedback resistor.

* * * * *